C. A. WENDELL.
CONTINUOUS AUTOMATIC DRIER.
APPLICATION FILED JUNE 17, 1915.
Reissued Dec. 17, 1918.
14,574.
3 SHEETS—SHEET 1.
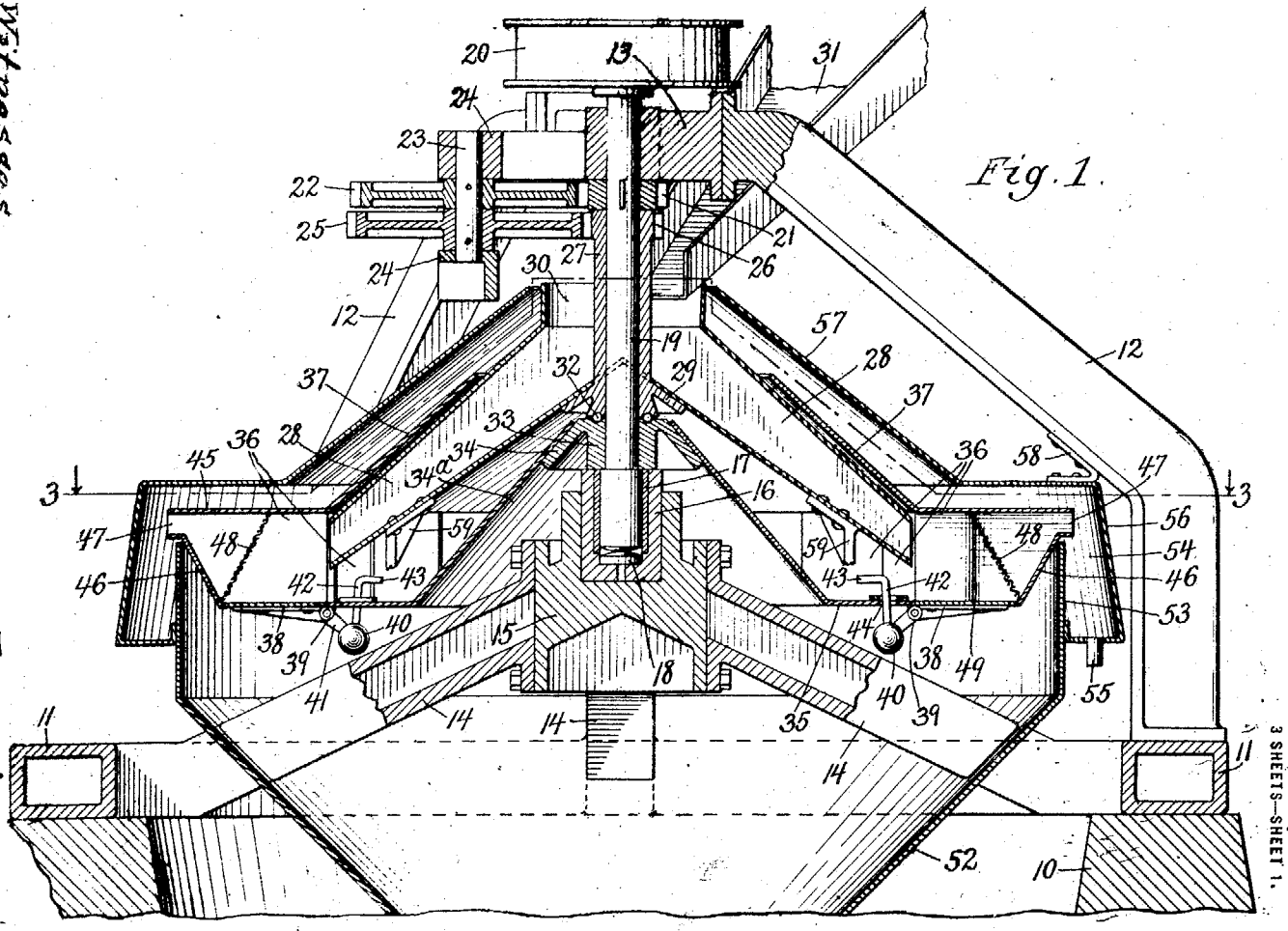
Witnesses.
Edward T. Wray
Bessie S. Pice.
Inventor.
Carl A. Wendell.
by C. C. Linthicum
Attorneys C. A. WENDELL.
CONTINUOUS AUTOMATIC DRIER.
APPLICATION FILED JUNE 17, 1915.
Reissued Dec. 17, 1918.
14,574.
3 SHEETS—SHEET 2.
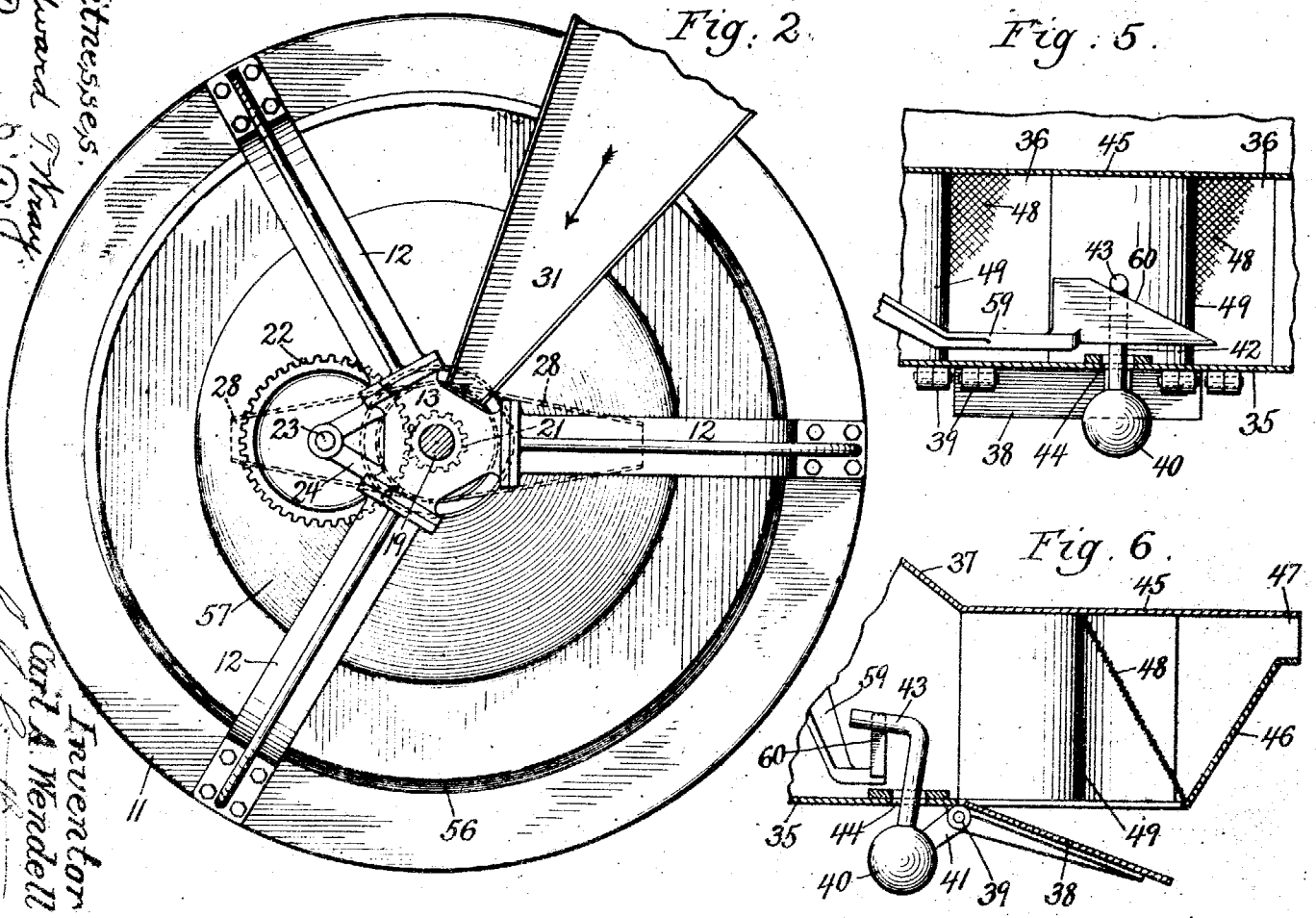
Witnesses.
Edward T. Wray.
Bessie S. Rice.
Inventor
Carl A. Wendell
by C. C. Linthicum
Attorneys

C. A. WENDELL.

CONTINUOUS AUTOMATIC DRIER.

APPLICATION FILED JUNE 17, 1915.

Reissued Dec. 17, 1918.

14,574.

3 SHEETS—SHEET 3.

Witnesses.
Edward T. Wray.
Bessie S. Rice.

Inventor.
Carl A. Wendell
by C. C. Linthicum
Attorneys.

UNITED STATES PATENT OFFICE.

CARL A. WENDELL, OF JOLIET, ILLINOIS.

CONTINUOUS AUTOMATIC DRIER.

14,574. Specification of Reissued Letters Patent. Reissued Dec. 17, 1918.

Original No. 1,088,754, dated Mar 3, 1914. Serial No. 700,748, filed May 31, 1912. Application for reissue filed June 17, 1915. Serial No. 34,763.

*To all whom it may concern:*

Be it known that I, CARL A. WENDELL, a citizen of the United States, residing at Joliet, in the county of Will and State of Illinois, have invented new and useful Improvements in Continuous Automatic Driers, of which the following is a specification.

My invention relates to driers, and refers particularly to continuous centrifugal driers which are adapted for use in drying coal and other solids.

I am aware that centrifugal driers have been used in the past, but one of the greatest disadvantages of such driers has been that it was necessary to periodically stop the drier in order to remove therefrom the dried product. It is the object of my invention to provide a drier which is economical in construction and which operates continuously and automatically so that no stoppage for the removal of the dried material is necessary. I carry out this object by using a rotatable separator, preferably of circular form, which has a plurality of pockets around its periphery. These pockets are supplied with the material to be dried by means of a rotatable spout which travels at a slightly different speed from that of the separator. In this way the material to be dried is fed successively to the above-mentioned pockets, which are automatically emptied just before the reception of new material to be dried. The pockets are provided with screens, perforated plates, or the like, to allow the escape of liquid which is discharged by centrifugal action. These and other advantages of my invention will be more readily understood by reference to the accompanying drawings, which show a preferred embodiment of my invention, and in which—

Figure 1 is a vertical section through my improved drier, taken on the line 1—1 of Fig. 3.

Fig. 2 is a plan of the parts shown in Fig. 1.

Fig. 5 is a fragmentary enlarged vertical section on the line 5—5 of Fig. 3, and Fig. 6 is a fragmentary enlarged vertical section on the line 6—6 of Fig. 3.

Figure 4:
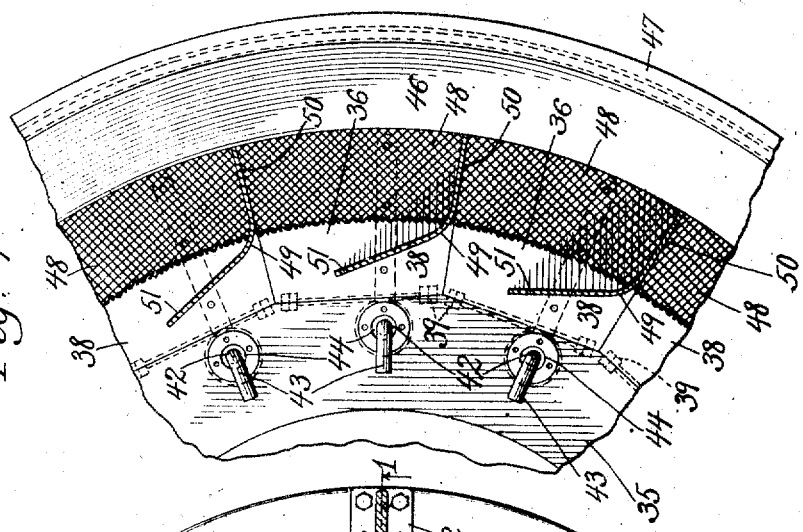
Fig. 4 is a fragmentary enlarged horizontal section of a portion of the body, showing the drying pockets.

Resting on the foundation 10 is the circular support 11, to which are suitably attached the frame members 12. These frame members are attached to, and support between them, the bearing member 13. Extending inwardly from the support 11 are the beams 14, which carry between them the bearing support 15, which, in turn, carries the bearing 16, having the bushing 17 and the end-thrust bearing 18.

The shaft 19, having the driving pulley 20, is supported by the bearing member 13 and the bearing 16 with its end-thrust bearing 18. The pinion 21 is keyed to the shaft 19, and is in mesh with the gear 22 rigidly mounted on the shaft 23, which, in turn, is carried by the bracket 24 attached to the bearing member 13. The gear 25, of slightly greater diameter than the gear 22, is also rigidly mounted on the shaft 23, and is in mesh with the pinion 26 on the end of sleeve 27, the latter encircling the shaft 19. One or more spouts 28 are fastened to the flange 29 of the sleeve 27 and rotate with the latter. The upper ends of the spouts 28 are provided with the collar 30, within which projects the end of the hopper 31. The lower end of the sleeve 27 is supported, by means of the balls 32, on the upper end of the member 33 rigidly mounted on the shaft 19. To the flange 34 of member 33 is attached the conical wall 34[a] of the separator, which is designated as a whole by 35.

The separator 35 has a plurality of pockets or compartments 36 around its periphery, and is provided with the shield 37 overlapping the spouts 28. Each of the pockets 36 has a movable bottom 38, hinged at 39, the counterbalancing weight 40 carried by the bracket 41 serving to normally keep each of the bottom plates 38 in closed position. A rod 42, having a bent end 43, is attached to each of the weights 40, this rod projecting upward through an aperture 44 in the bottom of the separator. Each pocket 36 is covered by the top plate 45, which, with the obliquely disposed plate 46, forms the outlets 47. Extending downward and outward through the pockets 36 is the separating screen 48, the edges of which are securely fastened on the top plate 45 and the lower edge of plate 46 respectively. The pockets 36 are separated from each other by a plurality of curved division plates 49, each of which preferably has a radial portion 50 and a portion 51 pointing in the direction opposite to that in which the separator rotates, as will be explained hereafter.

The receiving hopper 52 is carried by the beams 14 and has an upper flanged portion 53 extending to a position just below the outlets 47. The liquid receiving chamber 54, having outlet pipes 55, is formed by the portion 53 of the receiving hopper 52, and the plate 56, attached to said portion 53 and also suitably bent to form the casing or hood 57. The plate 56 is also attached to the frame members 12 by the brackets 58.

Figure 3:
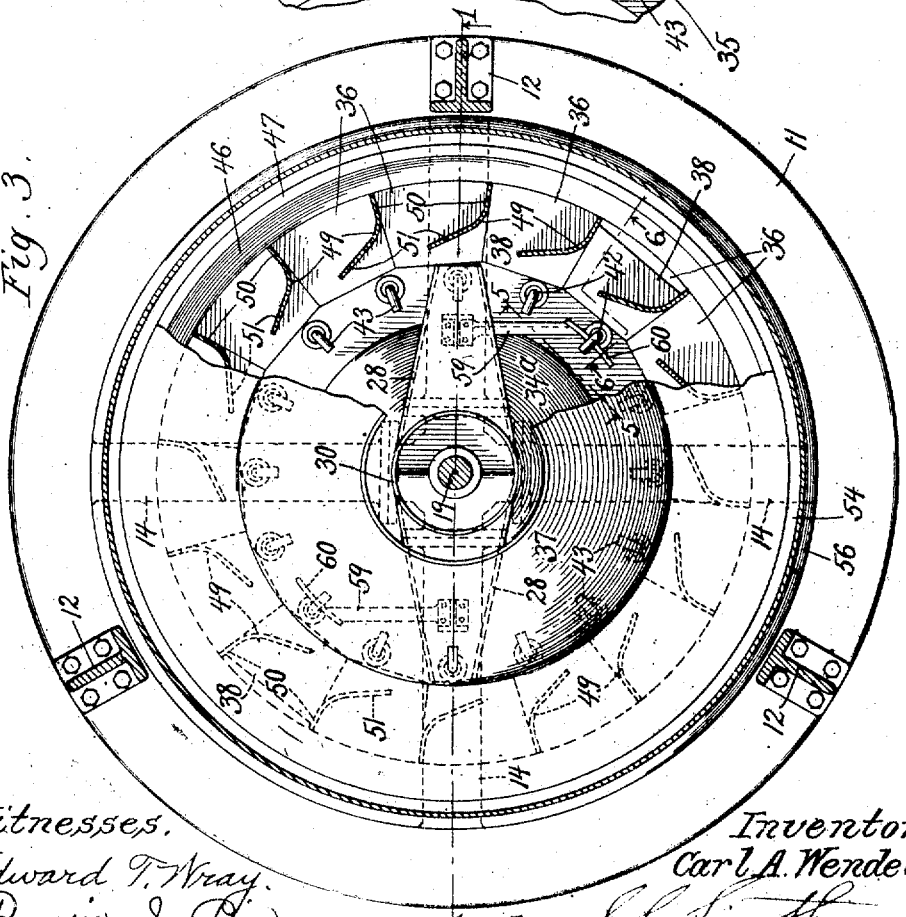
Fig. 3 is a horizontal section taken on the line 3—3 of Fig. 1, a portion of the casing being broken away to show the construction of the drying pockets.

As most clearly shown in Figs. 3, 5 and 6, each spout 28 carries an arm 59, having on its end the cam 60, adapted to engage the bent ends 43 of the rods 42, thereby raising the latter and causing the corresponding bottom plates 38 of the pockets 36 to be opened.

Having thus described the various parts used in my improved drier, its operation may now be readily understood:—

The shaft 19 is rotated at any desired speed, for example, two hundred revolutions per minute. This causes the separator 35 to be rotated at the same speed, but on account of the previously described differential gear connections between the shaft 19 and the sleeve 27 the latter is rotated at a slightly greater speed, for example, two hundred and one revolutions per minute. Coal, or other material to be dried, is now fed into the hopper 31, from which it passes into the spouts 28. For the sake of simplicity, let us assume there is only a single spout 28. From this spout the coal passes into one of the pockets 36. By centrifugal action the moisture in the coal is thrown outwardly through the screen 48, and thence passes through outlet 47 into the liquid receiving chamber 54 from which the liquid is drained through outlets 55. As the separator 35 and the spout 28 continue to revolve, the spout 28 will gradually pass to the next pocket 36, since the spout is mounted on the sleeve 27, which is rotating slightly faster than the separator 35. In this manner all the pockets 36 will be successively supplied with coal, the time required being exactly one minute if the spout 28 is rotating one revolution per minute more than the separator 35.

In order to make the operation of my drier continuous, it is necessary that the coal should be automatically discharged from the pockets 36. This is accomplished by means of the cam 60 on the end of arm 59 carried by the spout 28. It will be clear that when the separator 35 and the spout 28 are rotating in the direction indicated by the arrow in Fig. 3, the pocket in advance of the one being supplied with coal will be automatically opened by the cam 60, so that the coal in said pocket will be emptied into the receiving hopper 52. By the time the spout 28 reaches this pocket, the rod 42 will have been released from the cam 60, and the bottom plate 38 will have been closed, so that the pocket is ready to receive its portion of coal. Assuming that there are sixteen pockets, and the cam 60 is so placed that during the feeding of coal to any pocket the pocket next adjacent is emptied, and also assuming that only one spout is used, with the speeds previously mentioned, any given portion of coal will be subjected to the centrifugal drying action for a period of fifteen sixteenths ($\frac{15}{16}$) of a minute. When two spouts are used, this time would, of course, be exactly one-half as long. Any desired speed ratios of the spouts and separator, and any number of spouts, may be employed without departing from the spirit of my invention.

I employ the special form of division plates 49 which I have described so that the coal or other material to be dried is quickly and readily carried into contact with the screen 48.

It will be apparent that many changes could be made in the detailed structure of the parts which I have described without departing from the spirit or scope of my invention. For example, the pockets 36 may be provided with doors in any desired position, and these doors may be automatically opened by a great variety of equivalent devices; the differential speed between the spout or spouts and the separator may be attained in a number of different ways, and many other detailed changes of construction will readily occur to those skilled in the art.

The invention is not necessarily confined to or illustrated solely in the particular form of apparatus here shown. Generally speaking, it comprises in addition to the necessary operative elements a screen through which the water is expelled by centrifugal force, said screen arranged so that the material itself when dried can be discharged from such screen by centrifugal force, and means for intermittently permitting such discharge, particularly by opening the discharge way at a particular time, that is responsive to the relative movement of spout and receptacle. The device may be looked upon as one which results in placing the material in the form of an annulus rotating rapidly so as to cause the expulsion of moisture therefrom through the screen discharging sections of the dried material successively from such screen and feeding to the space in the ring thus affected another charge of moisture carrying material.

I claim:

1. In a centrifugal drier, the combination of a frame, a pair of horizontal, rotatable, differentially geared members, one of said members being in the form of a delivery spout, the other of said members acting as a separating member whereby moisture is projected from the material by centrifugal action, a screen carried by said last named member, said screen being mounted at an angle to the vertical, and a trap mounted in said last named member and located beneath said screen whereby materials forced against said screen by the centrifugal force is by the same force projected downwardly and outwardly through said trap, substantially as described.

2. In a device of the class described, the combination of a frame, a rotatable casing, a rotatable delivery spout, said casing and spout being differentially geared whereby both are rotated in the same direction but at different speeds, said casing being provided with a screen, said screen being secured to the bottom wall of said casing and extending upwardly and inwardly in a substantially straight line, and a trap mounted in the bottom wall of said casing, said trap serving the space over which said screen is inclined and means for periodically opening said trap the arrangement being such that centrifugal force tends to project downwardly and outwardly materials forced against said screen, substantially as described.

3. In a centrifugal drier, the combination of a frame, a pair of horizontal, rotatable, differentially geared members, one of said members being in the form of a delivery spout, the other of said members acting as a separating member whereby moisture is projected from the material by centrifugal action, the axis of rotation of said members being vertical, a screen carried by said last named member, said screen being mounted at an angle to the vertical, and a trap mounted in that portion of said last named member toward which the centrifugally actuated matter is guided by the screen, whereby material forced against said screen by the centrifugal force is by the same force projected outwardly through said trap, substantially as described.

4. In a centrifugal drying machine the combination of a frame, a feed spout, a material receptacle containing a screen through which the water is expelled by centrifugal force and a discharge way, means for rotating the spout and the receptacle differentially, and means for intermittently opening the discharge way responsive to the relative rotation of spout and receptacle.

5. In a centrifugal drying machine the combination of a frame, a feed spout, a material receptacle containing a screen through which the water is expelled by centrifugal force and a discharge way, means for continuously rotating the spout and the receptacle differentially, and means for intermittently opening the discharge way responsive to the relative rotation of spout and receptacle.

6. In a centrifugal drying machine the combination of a frame, a feed spout, a material receptacle containing a screen inclined at an angle to the axis of rotation and through which the water is expelled by centrifugal force and a discharge way toward which the centrifugally actuated matter is guided by the screen, means for rotating the spout and the receptacle differentially, and means for intermittently opening the discharge way responsive to the relative rotation of spout and receptacle.

7. In a centrifugal drying machine the combination of a frame, a feed spout, a material receptacle containing a screen inclined at an angle to the axis of rotation and through which the water is expelled by centrifugal force and a discharge way toward which the centrifugally actuated matter is guided by the screen, means for continuously rotating the spout and the receptacle differentially, and means for intermittently opening the discharge way responsive to the relative rotation of spout and receptacle.

8. In a centrifugal drying machine the combination of a frame, a feed spout, a material receptacle comprising a series of sections each containing a screen through which the water is expelled by centrifugal force and a discharge way, means for rotating the spout and the receptacle differentially, and means for intermittently opening the discharge way responsive to the relative rotation of spout and receptacle.

9. In a centrifugal drying machine the combination of a frame, a feed spout, a material receptacle comprising a series of sections each comprising a screen through which the water is expelled by centrifugal force and a discharge way, means for continuously rotating the spout and the receptacle differentially, and means for intermittently opening the discharge way responsive to the relative rotation of spout and receptacle.

10. In a centrifugal drying machine the combination of a frame, a feed spout, a material receptacle comprising a series of sections each containing a screen inclined at an angle to the axis of rotation and through which the water is expelled by centrifugal force and a discharge way toward which the centrifugally actuated matter is guided by the screen, means for rotating the spout and the receptacle differentially, and means for intermittently opening the discharge way responsive to the relative rotation of spout and receptacle.

11. In a centrifugal drying machine the combination of a frame, a feed spout, a material receptacle comprising a series of sections each containing a screen inclined at an angle to the axis of rotation and through which the water is expelled by centrifugal force and a discharge way toward which the centrifugally actuated matter is guided by the screen, means for continuously rotating the spout and the receptacle differentially and means for intermittently opening the discharge way responsive to the relative rotation of spout and receptacle.

12. In a centrifugal drying machine the combination of a feed spout and a ring shaped material receptacle to which the spout discharges from within, means for rotating them continuously differentially in the same direction, and means for discharging successive dried sections of the material from the ring receptacle in advance of the spout responsive to the relative rotation of spout and receptacle.

CARL A. WENDELL.

Witnesses:
MINNIE M. LINDENAU,
BESSIE S. RICE.